United States Patent
Cheluvaraja et al.

(10) Patent No.: US 9,972,310 B2
(45) Date of Patent: May 15, 2018

(54) SYSTEM AND METHOD FOR NEURAL NETWORK BASED FEATURE EXTRACTION FOR ACOUSTIC MODEL DEVELOPMENT

(71) Applicant: Interactive Intelligence Group, Inc., Indianapolis, IN (US)

(72) Inventors: Srinath Cheluvaraja, Carmel, IN (US); Ananth Nagaraja Iyer, Carmel, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days. days.

(21) Appl. No.: 14/985,560

(22) Filed: Dec. 31, 2015

(65) Prior Publication Data
US 2017/0193988 A1  Jul. 6, 2017

(51) Int. Cl.
*G10L 15/16* (2006.01)
*G10L 15/14* (2006.01)
*G10L 25/24* (2013.01)
*G10L 25/27* (2013.01)
*G06N 3/02* (2006.01)

(52) U.S. Cl.
CPC ............ *G10L 15/144* (2013.01); *G06N 3/02* (2013.01); *G10L 15/14* (2013.01); *G10L 15/16* (2013.01); *G10L 25/24* (2013.01); *G10L 25/27* (2013.01)

(58) Field of Classification Search
CPC ....... G10L 15/063; G10L 15/20; G10L 15/02; G10L 15/07; G10L 15/065
USPC ........ 704/219, 226, 232, 236, 260, E13.001, 704/202; 706/15, 48; 707/999.005; 382/130, 173
See application file for complete search history.

(56) References Cited

U.S. PATENT DOCUMENTS

| | | | | |
|---|---|---|---|---|
| 6,694,046 | B2 * | 2/2004 | Doi | ....................... G06T 7/0012 382/130 |
| 7,617,164 | B2 * | 11/2009 | Burges | ................. G06N 99/005 706/15 |
| 7,774,202 | B2 | 8/2010 | Spengler et al. | |
| 2011/0276332 | A1 * | 11/2011 | Maia | ...................... G10L 13/08 704/260 |
| 2014/0257805 | A1 | 9/2014 | Huang et al. | |
| 2015/0032449 | A1 | 1/2015 | Sainath et al. | |

(Continued)

OTHER PUBLICATIONS

International Search Report and Written Opinion for Application No. PCT/US2016/069257, dated Mar. 16, 2017, 9 pages.

*Primary Examiner* — Charlotte M Baker
(74) *Attorney, Agent, or Firm* — Lewis Roca Rothgerber Christie LLP

(57) ABSTRACT

A system and method are presented for neural network based feature extraction for acoustic model development. A neural network may be used to extract acoustic features from raw MFCCs or the spectrum, which are then used for training acoustic models for speech recognition systems. Feature extraction may be performed by optimizing a cost function used in linear discriminant analysis. General non-linear functions generated by the neural network are used for feature extraction. The transformation may be performed using a cost function from linear discriminant analysis methods which perform linear operations on the MFCCs and generate lower dimensional features for speech recognition. The extracted acoustic features may then be used for training acoustic models for speech recognition systems.

19 Claims, 3 Drawing Sheets

(56) References Cited

U.S. PATENT DOCUMENTS

| | | | |
|---|---|---|---|
| 2015/0127327 A1* | 5/2015 | Bacchiani | G10L 25/30 |
| | | | 704/202 |
| 2015/0161522 A1 | 6/2015 | Saon et al. | |
| 2016/0042734 A1* | 2/2016 | Cetinturk | G10L 15/02 |
| | | | 704/236 |
| 2016/0284347 A1* | 9/2016 | Sainath | G10L 15/16 |

* cited by examiner

SYSTEM AND METHOD FOR NEURAL NETWORK BASED FEATURE EXTRACTION FOR ACOUSTIC MODEL DEVELOPMENT

BACKGROUND

The present invention generally relates to telecommunications systems and methods, as well as automatic speech recognition systems. More particularly, the present invention pertains to the development of acoustic models used in automatic speech recognition systems.

SUMMARY

A system and method are presented for neural network based feature extraction for acoustic model development. A neural network may be used to extract acoustic features from raw MFCCs or the spectrum, which are then used for training acoustic models for speech recognition systems. Feature extraction may be performed by optimizing a cost function used in linear discriminant analysis. General non-linear functions generated by the neural network are used for feature extraction. The transformation may be performed using a cost function from linear discriminant analysis methods which perform linear operations on the MFCCs and generate lower dimensional features for speech recognition. The extracted acoustic features may then be used for training acoustic models for speech recognition systems.

In one embodiment, a method is presented for training acoustic models in speech recognition systems, wherein the speech recognition system comprises a neural network, the method comprising the steps of: extracting acoustic features from a speech signal using the neural network; and processing the acoustic features into an acoustic model by the speech recognition system.

In another embodiment, a method is presented for training acoustic models in speech recognition systems, wherein the speech recognition system comprises a neural network, the method comprising the steps of: extracting trainable features from an incoming audio signal using the neural network; and processing the trainable features into an acoustic model by the speech recognition system.

DETAILED DESCRIPTION

Figure 1:
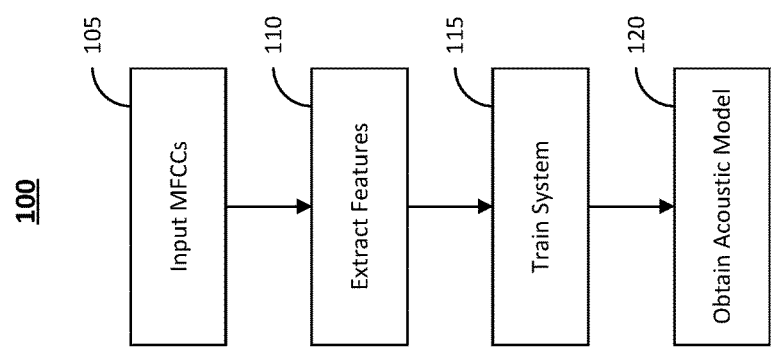
FIG. 1 is a flowchart illustrating an embodiment of an overall process of feature extraction.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Automatic speech recognition (ASR) systems generally use acoustic features as a front-end for recording the useful information in speech signals. These acoustic features may commonly be Mel Frequency Cepstral Coefficients (MFCCs) that are obtained by processing the incoming audio signal using well-known signal processing techniques in the art. MFCCs are easily extractable from an audio signal and may be de-correlated, which avoids redundancy in the feature set. In general, ASR systems may use MFCCs and their derivatives for model development and recognition. However, MFCCs and their derivatives do not always differentiate between similar sounds, such as similarly sounding audible phones, weak consonants, weak fricatives, weak plosives, and slurred speech, to name a few non-limiting examples. Linear Discriminant Analysis (LDA) methods that are inspired by statistics have been used with limited success to address this drawback.

In an embodiment, non-linear transforms may be used to perform operations on the MFCCs and generate lower dimensional features, which have better discriminative properties than MFCCs for speech recognition purposes. The transforms may be generated by optimizing a separation or discrimination function using a neural network to non-linearly map the MFCCs for feature generation. Neural networks are known for excellent function approximation, such that neural networks are capable of approximating complicated functions between input and output with sufficient training data. In an embodiment, neural networks, are utilized to extract well-trainable features from the MFCCs as opposed to using the neural networks at the probability calculation step of the process.

FIG. 1 is a flowchart illustrating an embodiment of an overall process of feature extraction, indicated generally at 100. The process of feature extraction illustrated in FIG. 1 uses a neural network and the extracted features may be processed into an acoustic model. The process 100 may occur in a speech recognition system, specifically, to construct an acoustic model for use in an ASR system.

In operation 105, high dimensional MFCCs are input to a feature extractor. In an embodiment, input may also comprise a spectrum. In an embodiment, a spectrum comprises a well-sampled speech signal as obtained from a discrete Fourier transform. The features may be obtained through processing an incoming audio signal using signal processing techniques known in the art. Control is passed to operation 110 and the process 100 continues.

In operation 110, features are extracted from a neural network. For example, the high dimensional MFCCs undergo neural network feature extraction. Low dimensional neural network LDA features result from the feature extraction. In an embodiment, neural network feature extraction optimizes cost functions more effectively than LDA, generating neural network-LDA (NN-LDA) features. Activation function parameters may be required in addition to weights and bias parameters. Parameters for the activation functions may be learned during model training. Activation functions may be linear, quadratic, or polynomial, and are capable of having as many parameters as desired.

In an embodiment, the neural network utilizes pre-aligned feature data and may be trained using a stochastic gradient descent method on the cost function. It should be noted that while LDA cost functions may be used for the stochastic gradient descent method, other cost functions may also be used. With LDA, for example, the cost function may represent a quantity that broadly measures separation between different acoustic classes.

In an embodiment, referring to the LDA cost function as a non-limiting example, the LDA cost function represents a measure of inter-class separation or discrimination. The function may be mathematically represented by:

$$\text{Cost} = -\text{Trace}(W^{-1}B)$$

where W represents the within class covariance matrix and B represents the between class covariance matrix. The within class covariance matrix may be defined as:

$$W_{\alpha\beta} = \sum_{C=0}^{N} P(C)\left(\frac{1}{N(C)}\right)\sum_{x \in C}(x_i^\alpha - \mu(C)^\alpha)(x_i^\beta - \mu(C)^\beta)$$

The mathematical formula for $W_{\alpha\beta}$ represents the sum over the covariance matrices of each class weighted by the fraction of times an individual class appears in the overall classification, where P(C) represents the individual class, the α index extends over the dimensionality of a feature factor (1 to 195, for example), μ(C) represents the class mean, N represents the number of classes, and N(C) represents the size of the data set in each class. The between class matrix may be defined using the N class means appropriately weighted as:

$$B_{\alpha\beta} = \Sigma_{C=0}^{N} P(C)(\mu(C)^\alpha - \mu^\alpha)(\mu(C)^\beta - \mu^\beta)$$

where μ represents the mean of all the class means, which may also be the same as the global feature mean of the data set. In an embodiment, B may also be determined by subtracting W from the full covariance matrix.

The activation functions of the neural network may be modified to permit the output features to be useful for training Gaussian Mixture Models (GMM) described below in operation 115. A non-linear function whose output takes a range of values may be used instead of a tan h function. Polynomial functions with linear, quadratic, or higher degree may be used. The coefficients of these functions may be considered as training parameters for training in addition to the weights connecting two layers and the biases at each node neuron.

Training may be performed using a stochastic gradient descent method using the gradient of the LDA cost function with respect to the neural network weights. This gradient is expressed in terms of the W and B matrix gradients as:

$$\delta\text{Cost} = -\text{Trace}(W^{-1}\delta B) + \text{Trace}(W^{-1}(\delta W)W^{-1}B)$$

The cost gradient may be computed in a standard way using backpropagation of the layer derivatives by the chain rule. The matrix gradients are easily expressible in terms of the hidden layer and output layer gradients from the expressions for the within class covariance matrix and the between class covariance matrix. Gradients with respect to the function parameters are also included in the total gradient. The input to the network comprises class aligned MFCC data. Control is passed to operation 115 and the process 100 continues.

In operation 115, a GMM is trained using low dimensional features obtained in operation 110 using well-known expectation maximization and maximum likelihood methods. Control is passed to operation 120 and the process 100 continues.

In operation 120, an acoustic model is generated and the process 100 ends.

In an embodiment, only the front-end of many ASR systems needs to be altered without any additional changes in the back-end.

Figure 2:
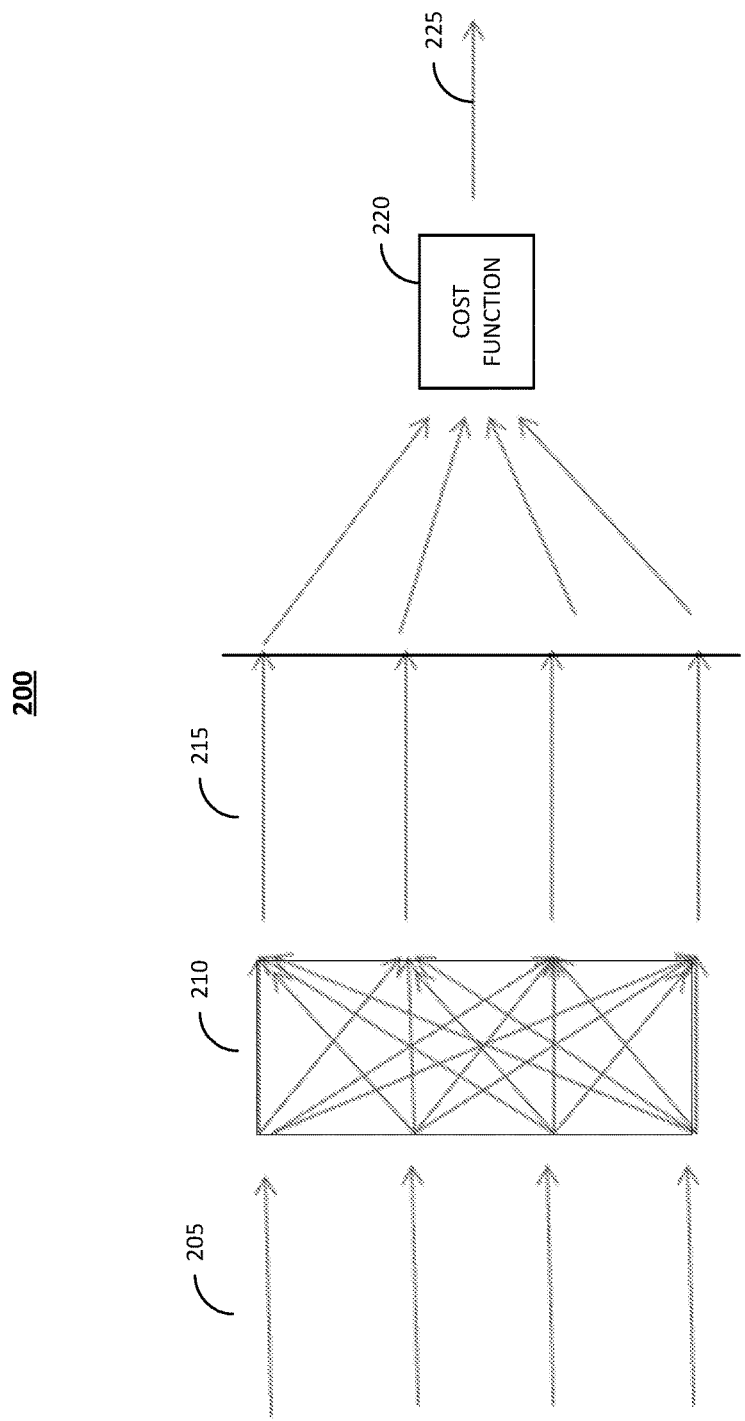
FIG. 2 is a diagram illustrating an embodiment of a two layer neural network and its cost determination.

FIG. 2 is a diagram illustrating an embodiment of a two layer neural network and its cost determination, indicated generally at 200. The weights may be shown as directed line segments connecting adjacent layers. In FIG. 2, class aligned MFCC data is input 205 to the first layer 210. The class aligned MFCC data may be obtained from a previously generated acoustic model. High dimensional input is preferable. For example, five (5) consecutive MFCC vectors and their derivatives, for a total of 195, may be used. The output from the second layer 215 comprises a lower dimensional (e.g., 40, for example) projection of the input obtained by optimizing the LDA cost function 220 used to lower network cost 225. The classes in the training data comprise those associated with states in a GMM. The network weights and biases are initialized with suitable values. Two useful initializations may comprise: the unit matrix (a simple projection of the input to the output) and the LDA transform. The LDA transform may be obtained from the eigenvectors of the matrix $W^{-1}B$ with only a subset of the largest eigenvalues being retained. Training may be continued over several epochs with a stopping criterion to prevent very low costs. The activation function parameters may also be changed along with the weights and biases at every training epoch.

In an embodiment, the standard LDA may be extended with a wider context from a recurrent network with linear activation functions and two layers, to one input and one output layer. LDA transforms require several frames of input to work to capture the contextual information present on both sides of a speech utterance. Size may be reduced by using a recurrent network with linear activation functions and training it with the LDA cost function. In an embodiment, the network trained with the LDA cost function is capable of generating features that may be used other than in acoustic model development.

Figure 3:
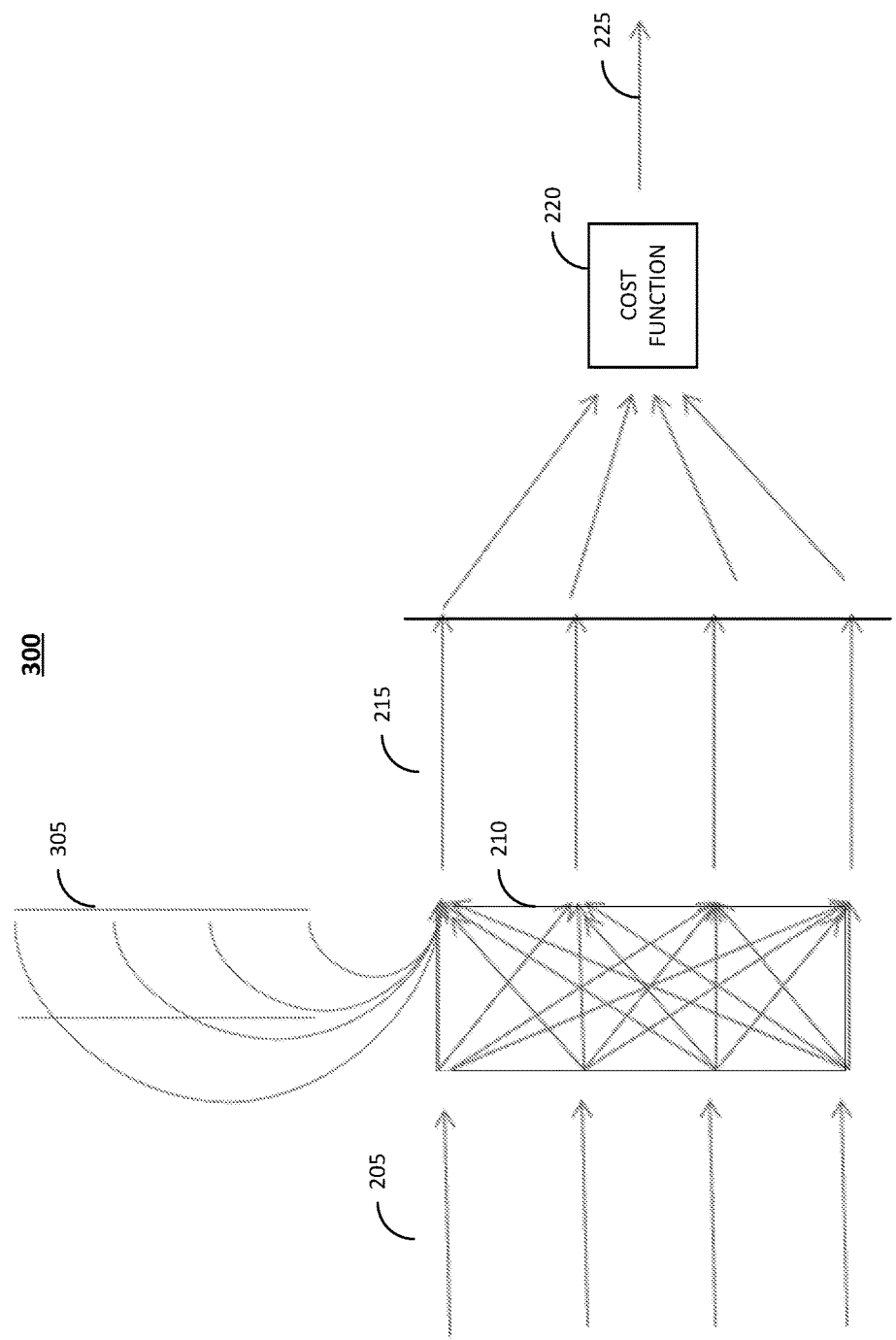
FIG. 3 is a diagram illustrating an embodiment of a recurrent neural network

FIG. 3 is a diagram illustrating an embodiment of a recurrent neural network, indicated generally at 300. The recurrent neural network for LDA has a wider context whose output at one instant 305 acts as input to the output layer at the next instant 215. The effect of the training is similar to that of using an infinite impulse response (IIR) filter with fewer taps instead of a large finite impulse response (FIR) filter.

The development of an acoustic model in operation 120 may be performed using the neural network LDA features. The features are used to train models using maximum likelihood and expectation maximization methods. For speech recording systems, this includes the usual steps of training monophone models and triphone models using Gaussian mixtures. Model training may be stopped when likelihood values stop rising and converge to stable values. In an embodiment where the neural network features are weakly cross-correlated, the correlations may be ignored or removed by an additional linear transformation.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for training acoustic models in speech recognition systems, wherein the speech recognition system comprises a neural network, the method comprising the steps of:

a. extracting acoustic features from a speech signal using the neural network; and
b. processing the acoustic features into an acoustic model by the speech recognition system,
wherein the neural network comprises at least one of: activation functions with parameters, prealigned feature data, and training,
wherein the training is performed using a stochastic gradient descent method on a cost function, and
wherein the cost function is a linear discriminant analysis cost function.

2. The method of claim 1, wherein the acoustic features are extracted from Mel Frequency Cepstral Coefficients.

3. The method of claim 1, wherein the features are extracted from a speech signal spectrum.

4. The method of claim 1, wherein the processing comprises using at least one of a maximum likelihood method and an expectation maximization method.

5. A method for training acoustic models in speech recognition systems, wherein the speech recognition system comprises a neural network, the method comprising the steps of:
a. extracting acoustic features from a speech signal using the neural network; and
b. processing the acoustic features into an acoustic model by the speech recognition system,
wherein the extracting of step (a) further comprises the step of optimizing a cost function,
wherein the cost function is capable of transforming general non-linear functions generated by the neural network.

6. The method of claim 5, wherein the transforming comprises:
a. performing non-linear operations on the features; and
b. generating lower dimensional features for speech recognition.

7. The method of claim 6, wherein the transforming further comprises the generation of Linear Discriminant Analysis transforms, wherein the transforms are generated by optimizing the cost function with linear activation functions.

8. The method of claim 5, wherein the neural network carries activation functions with variable parameters.

9. The method of claim 8, wherein the neural network is recurrent.

10. The method of claim 8, wherein the parameters are determined during training of the neural network.

11. A method for training acoustic models in speech recognition systems, wherein the speech recognition system comprises a neural network, the method comprising the steps of:
a. extracting trainable features from an incoming audio signal using the neural network; and
b. processing the trainable features into an acoustic model by the speech recognition system,
wherein the neural network comprises at least one of: activation functions
with parameters, prealigned feature data, and training,
wherein the training is performed using a stochastic gradient descent
method on a cost function, and
wherein the cost function is a linear discriminant analysis cost function.

12. The method of claim 11, wherein the trainable features are extracted from Mel Frequency Cepstral Coefficients, wherein the Mel Frequency Cepstral Coefficients are extracted from the audio signal.

13. The method of claim 11, wherein the processing comprises using at least one of a maximum likelihood method and an expectation maximization method.

14. A method for training acoustic models in speech recognition systems, wherein the speech recognition system comprises a neural network, the method comprising the steps of:
a. extracting trainable features from an incoming audio signal using the neural network; and
b. processing the trainable features into an acoustic model by the speech recognition system,
wherein the extracting of step (a) further comprises the step of optimizing a cost function, wherein the cost function is capable of transforming general non-linear functions generated by the neural network.

15. The method of claim 14, wherein the neural network carries activation functions with variable parameters.

16. The method of claim 15, wherein the neural network is recurrent.

17. The method of claim 15, wherein the parameters are determined during training of the neural network.

18. The method of claim 14, wherein the transforming comprises:
a. performing non-linear operations on the features; and
b. generating lower dimensional features for speech recognition.

19. The method of claim 18, wherein the transforming further comprises the generation of Linear Discriminant Analysis transforms, wherein the transforms are generated by optimizing the cost function with linear activation functions.

* * * * *